United States Patent [19]

Hemker et al.

[11] Patent Number: 4,903,470
[45] Date of Patent: Feb. 27, 1990

[54] SELF-PROPELLING HARVESTER THRESHER WITH TWO-PART CUTTING MECHANISM

[75] Inventors: Heinrich Hemker; Heinrich Ostrup, both of Harsewinkel, Fed. Rep. of Germany

[73] Assignee: Claas Ohg, Harsewinkel, Fed. Rep. of Germany

[21] Appl. No.: 238,038

[22] Filed: Aug. 29, 1988

[30] Foreign Application Priority Data

Sep. 14, 1987 [DE] Fed. Rep. of Germany ....... 3730790

[51] Int. Cl.$^4$ .............................................. A01B 73/06
[52] U.S. Cl. ...................................... 56/228; 56/15.5; 56/297; 172/311; 172/459
[58] Field of Search ................ 56/228, 297, 159, 14.6, 56/14.5, 15.5, 15.9, 16.2, 219, 385; 172/311, 459, 456

[56] References Cited

U.S. PATENT DOCUMENTS

| | | | |
|---|---|---|---|
| 2,224,970 | 12/1940 | Lingren et al. | 56/15.9 |
| 4,329,833 | 5/1982 | Witzel | 56/228 |
| 4,409,780 | 10/1983 | Beongher et al. | 56/228 |
| 4,564,025 | 1/1986 | Damman | 56/228 X |
| 4,715,172 | 12/1987 | Mosby | 56/228 |

FOREIGN PATENT DOCUMENTS

| | | | |
|---|---|---|---|
| 1151431 | 8/1983 | Canada | 56/228 |
| 1482896 | 12/1969 | Fed. Rep. of Germany . | |

Primary Examiner—Hoang C. Dang
Attorney, Agent, or Firm—Michael J. Striker

[57] ABSTRACT

A self-propelling harvester thresher comprises a conveyor, a two-part cutting mechanism having two cutting mechanism halves which are turnable substantially in a horizontal plane between a working position and a transporting position, elements allowing the turning of the cutting mechanism halves and including two turnable supports and a joint vertically extending hinge axle. The cutting mechanism halves are each connected through a respective one of the turnable supports with the inclined conveyor and also are connected with one another by the hinge axle.

21 Claims, 7 Drawing Sheets

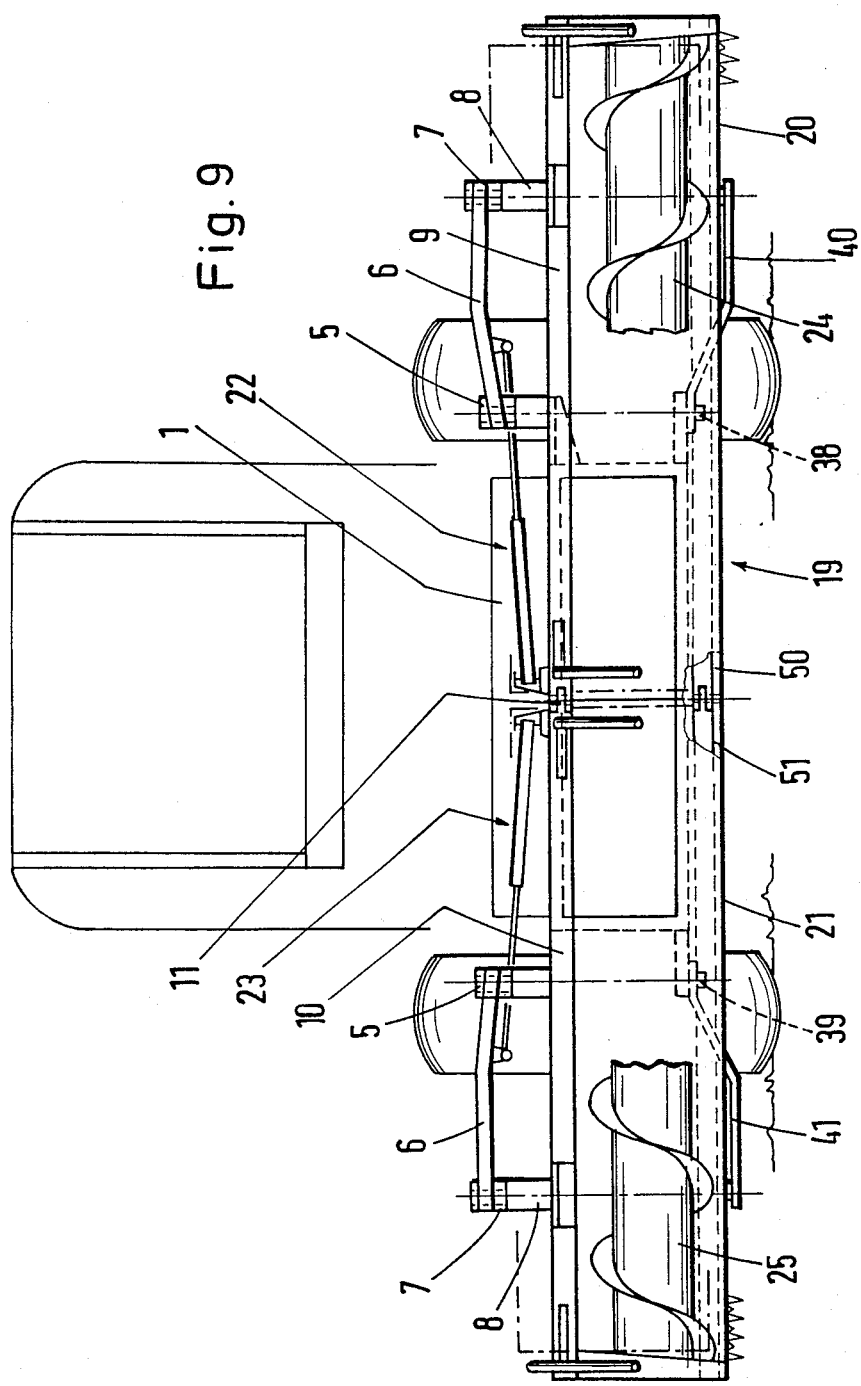

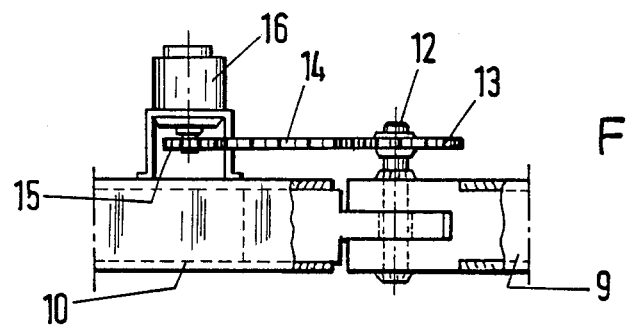
Fig. 10A
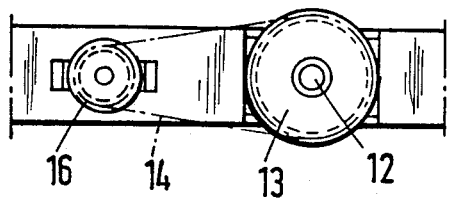
Fig. 10B
Fig. 13
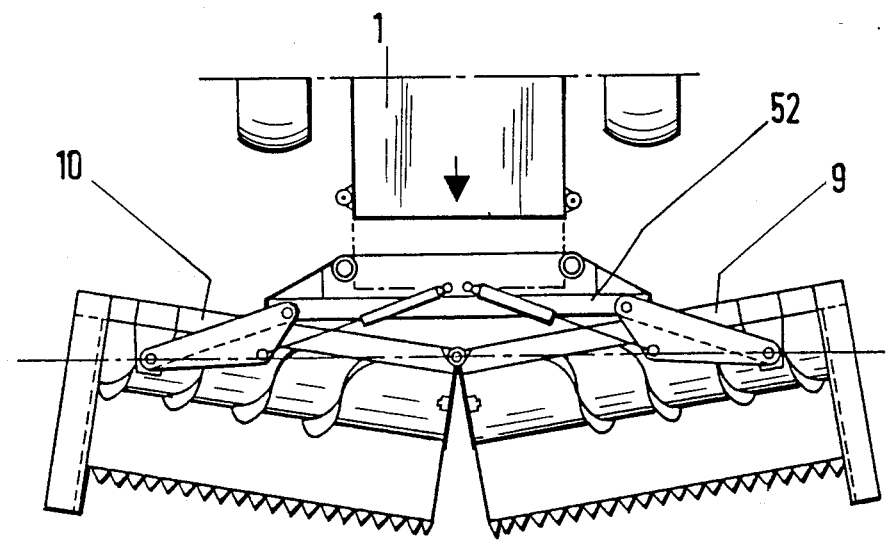

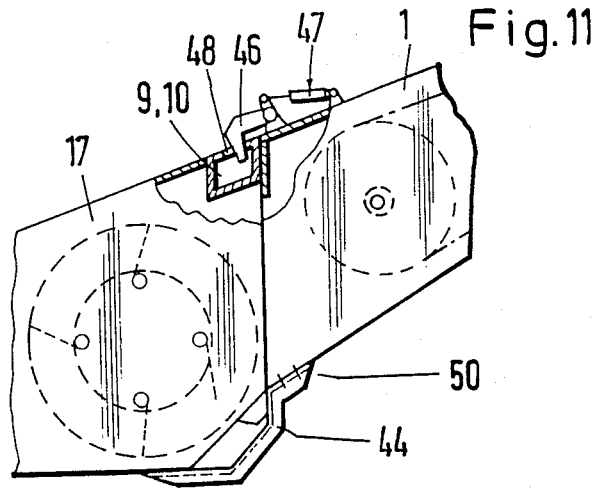
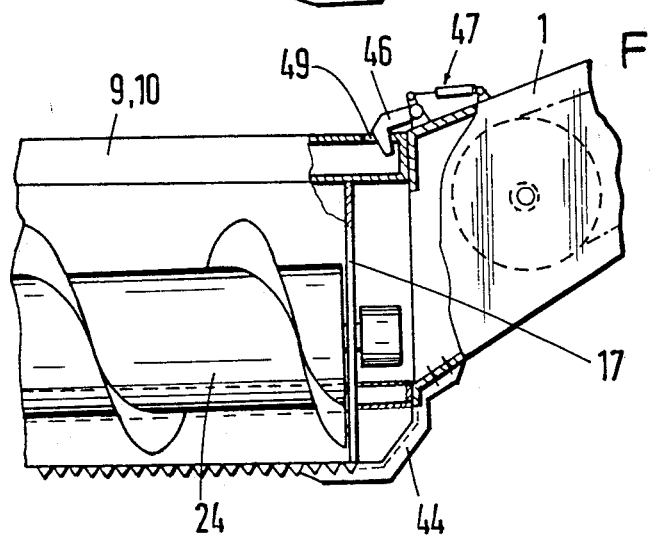

SELF-PROPELLING HARVESTER THRESHER WITH TWO-PART CUTTING MECHANISM

BACKGROUND OF THE INVENTION

The present invention relates to a self-propelling harvester thresher with a two-part cutting mechanism. More particularly, it relates to a self-propelling harvester thresher with an associated inclined conveyor and with a two-part cutting mechanism which is suspended on the inclined conveyor and has two turnable and symmetrical parts, wherein the cutting mechanism includes a subdivided cutting mechanism trough, a subdivided cutter bar and a subdivided pickup roller as well as a subdivided reel.

It is known that the permissible transporting width for harvester threshers on open streets amounts to 3 m. With the presently desired throughput quantities, the working devices for the harvester thresher, especially the cutting mechanism, are considerably wider. Because of this they must be removed from the harvester thresher during the street transportation, placed on a special transporting car and transported. This converting work requires a lot of time. On the other hand, the German document DE-AS 1,482,896 proposes a construction for the harvester thresher, which is provided with vertically foldable two-part cutting mechanism. For the purpose of street transportation, the outer ends of the cutting mechanism are turned upwardly, so that the maximum permissible width of 3 m is not exceeded. Such a harvester thresher has not been however used in practice, since both upwardly folded cutting mechanism ends extend in the field of vision of the driver which is prescribed by the respective regulations.

SUMMARY OF THE INVENTION

Accordingly, it is an object of the present invention to provide a self-propelling harvester thresher with a two-part cutting mechanism, which avoids the disadvantages of the prior art.

More particularly, it is an object of the present invention to provide a harvester thresher which is formed so that both cutting mechanism halves can be turned from its working position into its transporting position without limiting the field of vision of a driver.

In keeping with these objects and with others which will become apparent hereinafter, one feature of the present invention resides, briefly stated, in that the cutting mechanism halves of a cutting mechanism are turnable substantially in a horizontal plane, and on one hand through at least one turnable support are connected with an inclined conveyor channel and on the other hand through at least one common vertically extending hinge axle are permanently connected with one another, with means for rectilinear guidance of the hinge axis in the longitudinal direction of the machine.

In a harvester thresher designed in accordance with the present invention both halves of the cutting mechanism are turned in a horizontal plane so that the field of vision of a driver is no longer obstructed.

The turnable supports can be movable by means of cylinder-piston units which can be formed as synchronous units.

The hinge axle can be fixedly connected with one cutting mechanism half and carry a chain wheel which is connected with a further chain wheel forming part of hydraulic transmission-motor unit which in turn is connected with the other cutting mechanism half.

Both cutting mechanism halves can be provided in its region associated with the inclined conveyor with upper and lower traverses which are permanently centrally connected with one another by the above mentioned hinge axle.

The upper and lower traverse halves can overlap the cutting mechanism side walls, and the upper traverse halves can be provided in proximate ends with openings, in which teeth mounted on a turning shaft are turnable. Both upper traverse halves can be provided on their ends which extend beyond the cutting mechanism side walls, with additional openings in which the teeth after turning of the cutting mechanism halves to the transporting position are insertable.

The inclined conveyor can be provided on its end which faces toward the cutting mechanism, with a fixed frame. The turning shaft can be arranged on the frame or on an additional frame. A lower supporting plate can be welded to the frame so that both cutting mechanism halves are placed on the supporting plate.

The turning supports can be mounted through hinges directly on the frame of the inclined conveyor, or on an additional frame which can be coupled with the inclined conveyor.

Further supporting arms can be provided which are articulately connected by hinges on one end underneath the bottom plates of the cutting mechanism trough, and on the other end on the frame of the inclined conveyor or on an auxiliary frame which surrounds the inclined conveyor. Instead of the lower supporting arms, placing arms can be connected with the hinges and with the turning supports, for absorbing the weight of the cutting mechanism halves in the transporting position.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 9 is a view showing the harvester thresher of FIGS. 1 and 8 in a working position;

FIGS. 10A and 10B are views showing a detail of connecting point of cutting mechanism halves in the region of the upper traverses on a front view and a plan view, respectively;

FIG. 11 is a view showing a coupling location between the cutting mechanism and the inclined conveyor in a working position;

FIG. 12 is a view showing the coupling location of the cutting mechanism in a transporting position; and FIG. 13 is a plan view of a cutting table group and an inclined conveyor with an auxiliary frame located therebetween.

DESCRIPTION OF THE PREFERRED EMBODIMENTS

Figure 1:
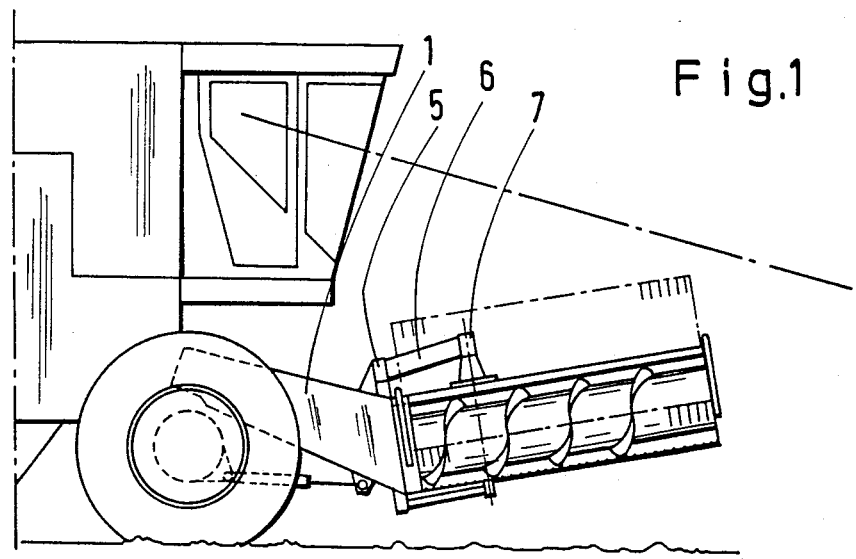
FIG. 1 is a partial side view of a harvester thresher with a cutting mechanism in a transporting position.

A harvester thresher is shown only partially in FIG. 1. It has an inclined conveyor which is identified with reference numeral 1 and provided on its front end as considered in the travelling direction, with a fixed frame 2. Upper and lower laterally extending consoles 3 and 4 are welded on the frame 2 as more clearly shown in FIG. 8.

Upwardly inclined turning supports 6 are connected with the upper console 3 through hinges 5. With their ends which face away of the hinges 5, the turning supports 6 are mounted on arms 8 through further hinges 7. The arms 8 serve as supports for a two-part traverse 9, 10, so that each arm 8 is associated with a respective traverse part 9 or 10. As can be seen from FIGS. 4–10, both traverse parts 9 and 10 are connected with one another centrally by a hinge 11, and a hinge pin 12 shown in FIG. 10 is fixedly connected with the traverse part 9.

The pin 12 has an end extending upwardly and carrying a chain wheel 13 which is fixedly connected with this end. The chain wheel 13 is in a drive connection through a chain 14 with a second chain wheel 15 which is a part of the hydraulic drive motor 16. The hydraulic drive motor 16 is connected by screws with the traverse part 10.

On their outer ends the traverse parts 9 and 10 are fixedly connected with cutting mechanism side walls 17 and 18 respectively. The side walls 17 and 18 form lateral closures of a cutting mechanism trough which is identified as a whole with reference numeral 19. The lower closure is formed by a two-part bottom plate 20, 21, and each half of it is connected with the associated side walls 17, 18 and the respective traverse part 9, 10.

Figure 5:
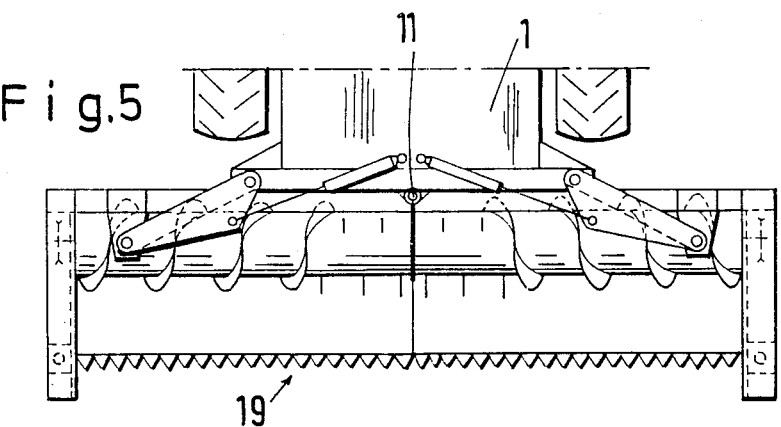
FIGS. 5–7 are views showing the cutting mechanism in three different positions.

As can be seen especially from FIGS. 2–6, cylinder-piston units 22 and 23 engage the turning support 6, so that the arms 8 can be turned about the hinge 5 and in particular with the help of the hydraulic motor shown in FIG. 10 so as to overcome the dead point position identified in FIG. 5, relative to the articulated connection of the cylinder-piston units 22 and 23 on the turning supports 6 and on the hinge 11.

A two-part cutting mechanism 19 is described in detail hereinbelow. It can be turned from the position shown in FIG. 4 to the position shown in FIG. 6. For this purpose it is naturally required that the picking up roller is subdivided into two parts 24 and 25, when one of its parts is supported in the cutting mechanism side wall 17 and the other part is supported in the wall 18. The drive of both halves 24 and 25 is performed through chain wheels 26 and 27 and also through hydraulic motors 28 and 29 which are mounted on the side walls 17 and 18. Further hydraulic motors 30 and 31 which are mounted on the side walls 17 and 18 serve as a drive for wobble transmissions 32 and 33 of both cutter bar halves 34 and 35. Since the cutter bar halves 34 and 35 are guided on the bottom plates 20, 21 an additional support of the cutter bar halves can be dispensed with. In contrast, both halves 24 and 25 of the picking up roller are supported outside the associated walls 17 and 18 in the region of their proximal ends on supporting plates 36 and 37. Each supporting plate is welded with a respective one of the traverse parts 9 and 10.

Figure 6:
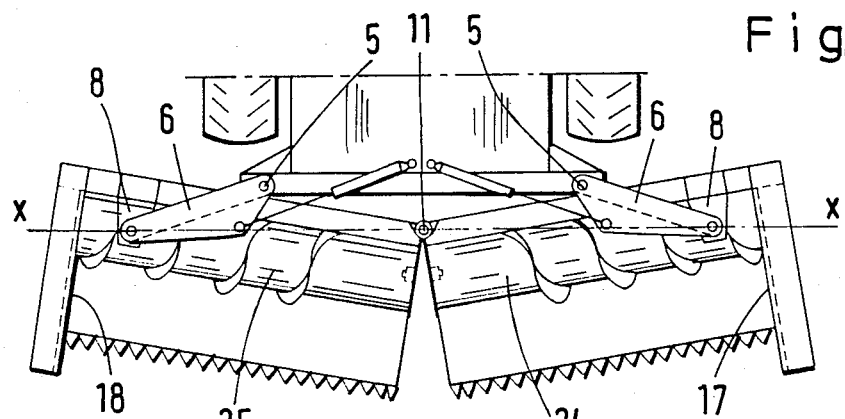
Figure 7:
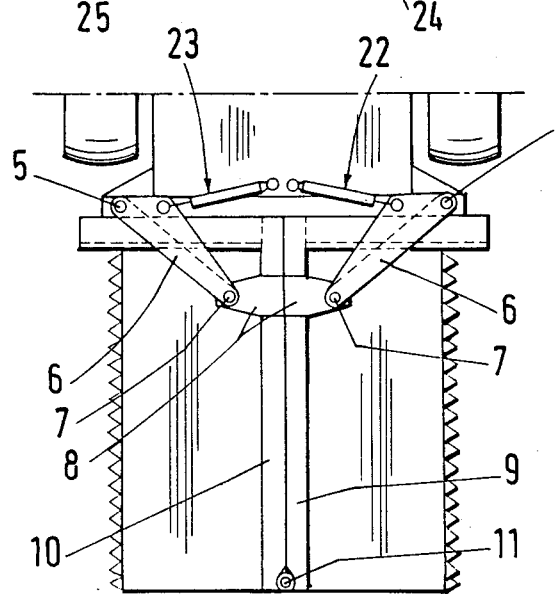
Figure 8:
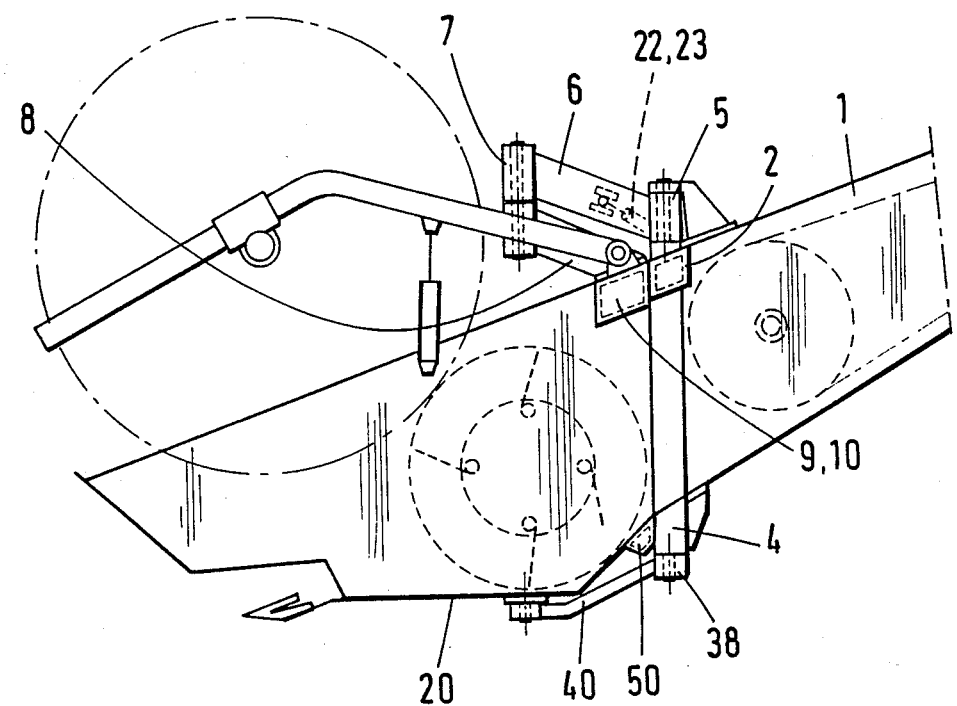
FIG. 8 is a side view of the cutting mechanism of FIG. 1 in a different projection.

As can be seen from FIGS. 7, 8 and 9, supporting arms 40 and 41 are connected with the lower console 4 through hinges 38 and 39. They have ends which face away of the hinges and are articulately connected underneath both bottom plates 20 and 21, so as to take up the weight of both cutting mechanism halves which must not be supported by the turning support 6 and the arms 8. Another possibility to support both cutting mechanism halves at least in their transporting position as shown in FIGS. 3, 6 is that the axes of both upper hinges 5 with their associated axes of both lower hinges 5 are connected with the associated axes of both lower hinges 38 and 39 as shown at the left side of FIG. 8. As an alternative or in addition to it, also on both lower ends of these elongated axes, placing arms 42 and 43 can be mounted as shown in the working position in FIG. 2, so that they support both cutting mechanism halves, and by turning of the latter from the position shown in FIG. 2 to the position shown in FIG. 3 turned under the cutting mechanism halves and support them. Such a support is normally sufficient since both the mechanism halves in the region of their proximal ends rest in their turning end positions shown in FIGS. 3, 11, 12 on a central lower horizontal supporting plate 44 which is fixedly connected with the frame 2 of the inclined conveyor 1.

Figure 2:
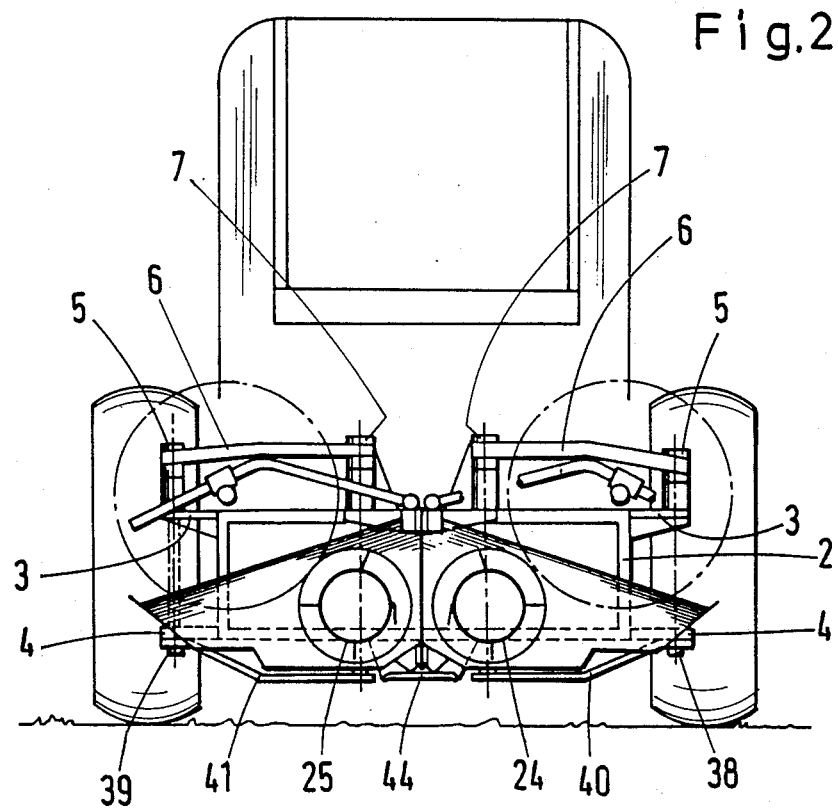
FIG. 2 is a front view of the harvester thresher shown in FIG. 1.
Figure 3:
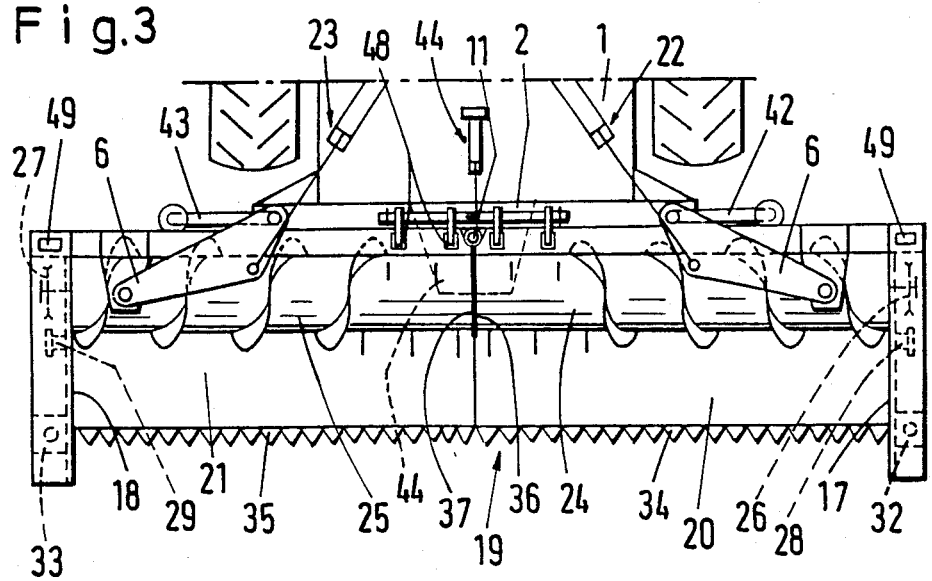
FIG. 3 is a plan view of the cutting mechanism of the harvester thresher in a working position.
Figure 4:
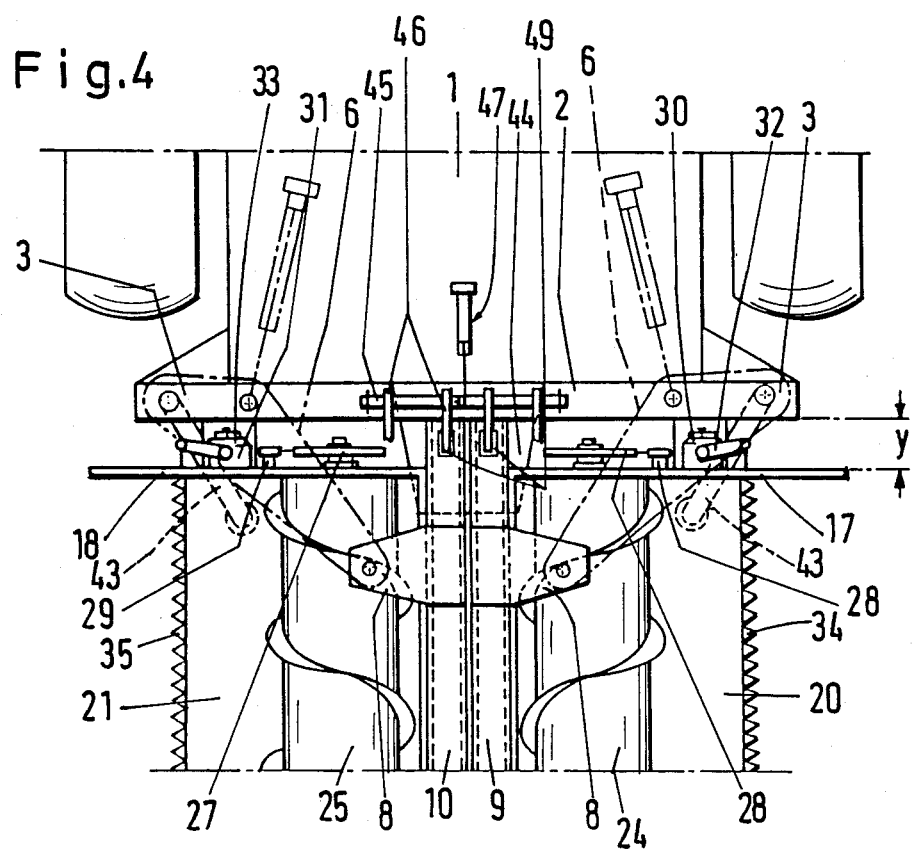
FIG. 4 is a view showing the cutting mechanism of FIG. 1 in a folded transporting position.

For locking both halves of the cutting mechanism 9 both in the working position shown in FIG. 2 as well as in the transporting position, a turning shaft 45 is supported on the frame 2 and carries four locking hooks 46. It is turnable by a cylinder-piston unit 47. From FIG. 3 it can be seen that for locking in the working position, the locking hooks 46 engage in arresting opening 48 provided in the traverse parts 9 and 10. Further arresting openings 49 which are arranged in the working position on distal ends of the traverse parts 9 and 10, serve for locking the cutting mechanism halves in the transporting position shown in FIGS. 2, 4 and 12. The distal ends of the traverses 9 and 10 in the joint hinge 11 extend in their length over both side walls 17 and 18 and are supported in the transporting position on the inclined conveyor or an intermediate auxiliary frame 52. Thereby, a space shown in FIG. 3 remains between the inclined conveyor 1 and the cutting table halves for protective accommodation of the drive elements for the cutter bars 34 and 35 of the roller halves 24 and 25 and the reel drives.

For reinforcing both cutting table halves, additional traverses 50 and 51 are provided under the above mentioned traverse in connection with the bottom plates 20 and 21. The additional traverses 50 and 51 are connected coaxially to the traverse parts 9 and 10 through a hinge 11.

It will be understood that each of the elements described above, or two or more together, may also find a useful application in other types of constructions differing from the types described above.

While the invention has been illustrated and described as embodied in a self-propelling harvester thresher with two-part cutting mechanism, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. A self-propelling harvester thresher, comprising an inclined conveyor; a two-part cutting mechanism having two cutting mechanism halves which are turnable substantially in a horizontal plane between a working position and a transporting position; and means allowing the turning of said cutting mechanism halves and including two turnable supports and a joint vertically extending hinge axle, said cutting mechanism halves being each connected through a respective one of said turnable supports with said inclined conveyor and also being connected with one another by said hinge axle.

2. A self-propelling harvester thresher as defined in claim 1, wherein said joint hinge axle is rectilinearly movable in a longitudinal direction of the harvester; and further comprising means for rectilinearly guiding said joint hinge axle in the longitudinal direction.

3. A self-propelling harvester thresher as defined in claim 1, wherein said cutting mechanism includes a subdivided cutting mechanism trough, a subdivided cutting bar, a subdivided picking up roller, and a subdivided reel.

4. A self-propelling harvester thresher as defined in claim 1; and further comprising means for turning said turnable supports and including two cylinder-piston units.

5. A self-propelling harvester thresher as defined in claim 4, wherein said cylinder-piston units are formed as synchronously operating units.

6. A self-propelling harvester thresher as defined in claim 1, wherein said axle is fixedly connected with one of said cutting mechanism halves and has an end; and further comprising a chain wheel supported on said end of said axle, and a further chain wheel connected with said first mentioned chain wheel and forming a part of a hydraulic transmission-motor unit which is connected with the other of said cutting mechanism halves.

7. A self-propelling harvester thresher as defined in claim 1, wherein said cutting mechanism halves include cutting mechanism trough halves which have regions facing toward said inclined conveyor and are provided in said regions with upper and lower traverses which are centrally connected with one another through said hinge axle.

8. A self-propelling harvester thresher as defined in claim 7, wherein said cutting mechanism has side walls, said upper and lower traverses having traverse halves which extend beyond said side walls, said upper traverse halves have ends which face towards one another in the working position of said cutting mechanism; and further comprising means for locking said cutting mechanism halves in the working position and including openings provided on said ends of said upper traverse halves, a turning shaft, and teeth mounted on said turning shaft and turnable into said openings.

9. A self-propelling harvester thresher as defined in claim 1, wherein said inclined conveyor has an end which faces toward said cutting mechanism and is provided on said end with a fixed frame.

10. A self-propelling harvester thresher as defined in claim 8, wherein said upper traverse halves have outwardly extending ends which extend beyond said side walls of said cutting mechanism in a transporting position; further comprising means for locking said cutting mechanism halves in said transporting position and including additional openings provided on said outwardly extending ends of said upper traverse halves outwardly extending in which said teeth are turnable upon turning said cutting mechanism halves to the transporting position.

11. A self-propelling harvester thresher as defined in claim 8, wherein said inclined conveyor has an end which faces toward said cutting mechanism and is provided on said end with a fixed frame, said turning shaft being arranged on said frame.

12. A self-propelling harvester thresher as defined in claim 8, wherein said inclined conveyor has an end which faces toward said cutting mechanism and is provided on said end with a fixed frame; and further comprising an auxiliary frame, said turning shaft being mounted on said auxiliary frame.

13. A self-propelling harvester thresher as defined in claim 9; and further comprising a lower supporting plate which is connected to said frame and arranged so that both cutting mechanism halves are placed on said lower supporting plate.

14. A self-propelling harvester thresher as defined in claim 1, wherein said conveyor is provided with a frame, said turnable supports being turnably mounted on said frame of said conveyor; and further comprising means for turnably mounting said turnable supports on said frame and including hinges.

15. A self-propelling harvester thresher as defined in claim 1, wherein said conveyor is provided with a frame; and further comprising an auxiliary frame which is coupleable with said conveyor, said turnable supports being turnably mounted on said auxiliary frame; and means for turnably mounting said turnable supports on said auxiliary frame and including hinges.

16. A self-propelling harvester thresher as defined in claim 14, wherein said cutting mechanism has a subdivided cutting mechanism trough provided with bottom plates, said inclined conveyor having a frame; and further comprising two supporting arms having a first ends located under and connected with said bottom plates and second ends connected with said frame of said inclined conveyor; and further comprising means for connecting said second ends with said frame and including hinges.

17. A self-propelling harvester thresher as defined in claim 15, wherein said cutting mechanism has a subdivided cutting mechanism trough provided with bottom plates, said conveyor having a frame; and further comprising an auxiliary frame, and two supporting arms having first ends which are located under and connected with said bottom plates and second ends which are connected with said auxiliary frame; and further comprising means for connecting said second ends with said auxiliary frame and including hinges.

18. A self-propelling harvester thresher as defined in claim 16, wherein said hinges have axes which are coaxial with one another.

19. A self-propelling harvester thresher as defined in claim 17, wherein said hinges have axes which are coaxial with one another.

20. A self-propelling harvester thresher as defined in claim 1; and further comprising placing arms which are fixedly connected with said turnable supports for joint turning therewith and arranged for supporting said cutting mechanism halves in the transporting position.

21. A self-propelling harvester thresher as defined in claim 1, wherein said two-part cutting mechanism is suspended on said conveyor.

* * * * *